UNITED STATES PATENT OFFICE.

LEON S. BRACH, OF NEW YORK, N. Y.

COMPOSITION OF MATTER.

1,004,847. Specification of Letters Patent. Patented Oct. 3, 1911.

No Drawing. Application filed April 3, 1911. Serial No. 618,570.

*To all whom it may concern:*

Be it known that I, LEON S. BRACH, residing at New York, in the county of New York and State of New York, have invented certain new and useful Improvements in Composition of Matter, of which the following is a specification.

This invention relates to a new and useful paste composition adapted for joining metallic members or surfaces.

One of the objects of the invention is to provide a composition solder and flux which will at all times remain at a uniform pasty consistency, so that it may be put up in collapsible tubes and used therefrom without preliminary stirring.

More particularly my invention contemplates the provision of a metallic solder in pulverized form and a liquid flux combined with a carrier or vehicle, such that the solder particles are at all times held in the same relative position without likelihood of subsidence on standing, the pasty or somewhat fluid mixture, in other words, maintaining its homogeneity.

In the manufacture of my improved paste, I first mix twenty parts of chlorid of zinc with ten parts of water to form a saturated solution. I then add to this solution thirty-five parts of highly refined petrolatum, that is, petrolatum having a relatively low specific gravity and a relatively low melting point. After these have been thoroughly mixed by stirring, so that the petrolatum has taken up the saturated solution of zinc chlorid and water, I add to the mixture thirty parts of unrefined petrolatum, that is petrolatum having a relatively high specific gravity and a relatively high melting point, thorough mixture of the whole being then made by stirring. In some cases I also find it desirable to add to the above mixture five parts of rosin, which may be mixed with the mass by first reducing the rosin to a liquid state by application of heat, and mixing the same with a small amount of the petrolatum. This mixture may then be stirred into the general mass. In some cases also it may be desirable to add to the above a small quantity of metallic zinc for the purpose of counter-acting the effect of the presence of any free hydrochloric acid in the mixture.

Having mixed the flux with the carrier as above described, I now stir in powdered solder, which preferably comprises powdered tin and lead in the proportion of fifty parts of tin and fifty parts of lead; the solder being combined with the flux and a carrier preferably in the proportion of one part of the carrier to three parts of the powdered metal, although these proportions may vary without departing from the spirit or scope of this invention. The proportion of the metals relatively to each other may also be varied in accordance with the quality of solder desired; the proportion of tin being increased when a hard solder is wanted and the proportion of lead being increased when a soft solder is desired.

The composition described above is such that the mixture maintains its homogeneity, the particles of solder are held in fixed relation to each other so that the paste is always ready for most effective use; there is no danger of subsidence of solder particles taking place on standing, so that no stirring is required preliminary to using the paste; wherefore the paste may be readily put up in collapsible tubes and used directly therefrom, a quantity of the solder being squeezed from the neck of the tube upon the work as required. By the term "paste" as employed in this specification and claims, it is intended to refer to a composition of such consistency that it may be put up in collapsible tubes and squeezed therefrom through a relatively small discharge nozzle.

As many changes could be made in the above composition in the way of varying the proportions thereof, without departing from the scope of the invention, it is intended that all the matter contained in the above description shall be interpreted as merely descriptive of one form of embodiment of my invention and not in a limiting sense. It is also to be understood that the language used in the following claims is intended to cover all of the generic and specific features of the invention herein described and all statements of the scope of the invention, which as a matter of language, might be said to fall therebetween.

Having thus described my invention, what I claim as new and desire to secure by Letters Patent, is:

1. The herein described homogeneous paste, comprising a metallic solder in powdered form mixed with a flux, and with a vehicle of such consistency that the homogeneity of the mixture is maintained at all times.

2. The herein described homogeneous paste, comprising a solution of a de-oxidizing agent in water, mixed with a carrier and soldering metal in powdered form, the whole constituting an emulsion whose homogeneity is maintained at all times.

3. The herein described homogeneous paste, comprising a solution of a de-oxidizing agent in water, mixed with a carrier comprising refined and unrefined petrolatum, and metal solder in powdered form, the whole comprising an emulsion whose homogeneity is maintained at all times.

4. The herein described homogeneous paste, comprising twenty parts of chlorid of zinc in solution of ten parts of water, thirty parts of refined petrolatum, thirty-five parts of unrefined petrolatum, five parts of rosin, and powdered tin and lead in the proportion of one part of the metal to three parts of the other materials, the whole constituting an emulsion of enduring homogeneity.

In testimony whereof I have affixed my signature in the presence of two witnesses.

LEON S. BRACH.

Witnesses:
A. S. HONIGSBERG,
NATHALIE THOMPSON.